United States Patent [19]

Kacalieff

[11] Patent Number: 4,870,736

[45] Date of Patent: Oct. 3, 1989

[54] METHOD OF ASSEMBLING A MOLDED HUB AND TIRE

[75] Inventor: Christ D. Kacalieff, St. Louis County, Mo.

[73] Assignee: Chris Kaye Plastics Corp., St. Louis, Mo.

[21] Appl. No.: 145,256

[22] Filed: Jan. 19, 1988

[51] Int. Cl.$^4$ ................................................ B21K 1/40
[52] U.S. Cl. .................................... 29/159.1; 29/159.3; 29/447; 29/159.01; 264/247; 301/63 PW
[58] Field of Search ............... 29/159.1, 159.3, 159.01, 29/447; 301/63 PW; 264/247

[56] References Cited

U.S. PATENT DOCUMENTS

| | | | |
|---|---|---|---|
| 2,665,521 | 1/1954 | Ford | 301/63 PW |
| 3,452,798 | 7/1969 | Ravreby | 301/63 PW |
| 3,578,812 | 5/1971 | Taussig | 301/63 PW |
| 3,952,786 | 4/1976 | Kreling et al. | 301/63 PW X |
| 4,387,070 | 6/1983 | Cunard et al. | 264/247 |
| 4,444,435 | 4/1984 | Honsa | 301/63 PW |
| 4,588,542 | 5/1986 | Pierce | 301/63 PW X |
| 4,682,393 | 7/1987 | Corkery | 301/63 PW X |

Primary Examiner—Timothy V. Eley
Assistant Examiner—Frances Chin
Attorney, Agent, or Firm—Gravely, Lieder & Woodruff

[57] ABSTRACT

A wheel having a hub and a tire mounted on the hub in which the hub is molded with a central bearing surface for an axle and a circumferential rim for a tire, and the tire is molded with a circumferential tread having a side wall at one edge and a formed lip at the opposite edge. The hub rim is molded with notches on its opposite edges and is allowed to become dimensionally stable after molding while the tire is, after being molded, joined to the hub by passing the formed lip over the hub rim to engage one of the hub rim notches for securing the tire to the hub and allowing the tire to cool and become dimensionally stable while on the hub.

4 Claims, 2 Drawing Sheets

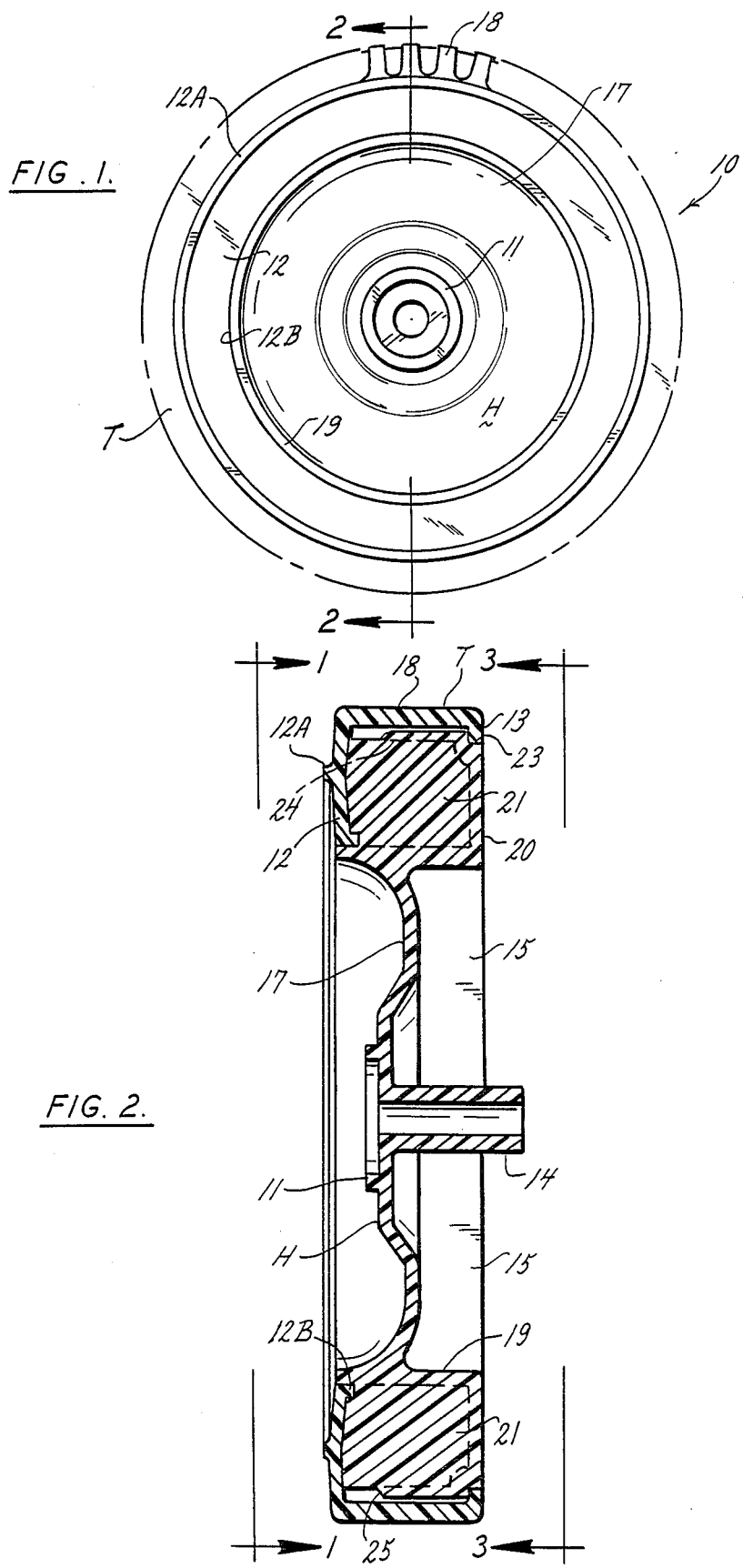

METHOD OF ASSEMBLING A MOLDED HUB AND TIRE

BACKGROUND OF THE INVENTION

1. Field of the Invention

This invention relates to manufacture of molded wheel hubs and tires for interfit, and to the method of assembling a molded hub and tire.

2. Description of the Prior Art

The prior art includes wheel hubs and tires interlocked to form one unitary assembly. The prevailing methods are to have the hub and tire separately molded or formed prior to assembly, after which special interlocks are necessary, and in some cases the separately formed tire has required special tooling to stretch the tire in order to assemble it on the hub. In some other instances the hub is formed of metal having spokes radiating out from a central bearing body to a rim shaped to receive a tire. The presently known prior are includes 2,665,521 of Jan. 12, 1954; 3,452,798 of July 1, 1969; 3,578,812; 3,952,786 of Apr. 27, 1976; 4,387,070 of June 7, 1983; 4,444,435 of Apr. 24, 1984; and 4,682,393 of July 1987.

A great many of the wheel and tire assemblies are quite expensive to fabricate and require expensive tools for the manufacture thereof as well as for effecting the assembly. The need for an inexpensive molded type tire and hub assembly is quite evident, and in order to supply that need in an economical manner it is necessary to break with the past and devise new techniques which will result in satisfying the needs for a complete wheel formed with rugged and inexpensive molded hubs and tires which are adapted to be joined and yet remain in a secure assembly.

BRIEF SUMMARY OF THE INVENTION

Applicant has devised a unique and inexpensive wheel which can produce considerable savings in cost of manufacture while resulting in a rugged yet pleasing appearance for a wheel of molded character.

The principal object of the invention is to configure the hub and the tire in such a way that these parts can be assembled at the proper time following the molding operations to secure the tire on the hub and eliminate relative movement between the parts.

A further principal object is achieved by molding the periphery of the hub with a surface to guide the tire into position on the periphery, and to configure the tire so that it will embrace and lock itself on the periphery or rim of the hub without the need for special assembly tools.

Other objects of the present invention are realized by effecting the mounting of the tire on the hub peripheral surface prior to the time when the tire air-cures and contracts to its final size.

DESCRIPTION OF THE DRAWINGS

The present invention is illustrated in its preferred configuration in the following several drawing views, wherein:

FIG. 1 is a view of a finished wheel as seen from the normally exposed side when in use, the view being taken along line 1—1 in FIG. 2;

FIG. 2 is a sectional view of the tire when assembled on the hub;

DESCRIPTION OF THE PREFERRED EMBODIMENT

Figure 3:
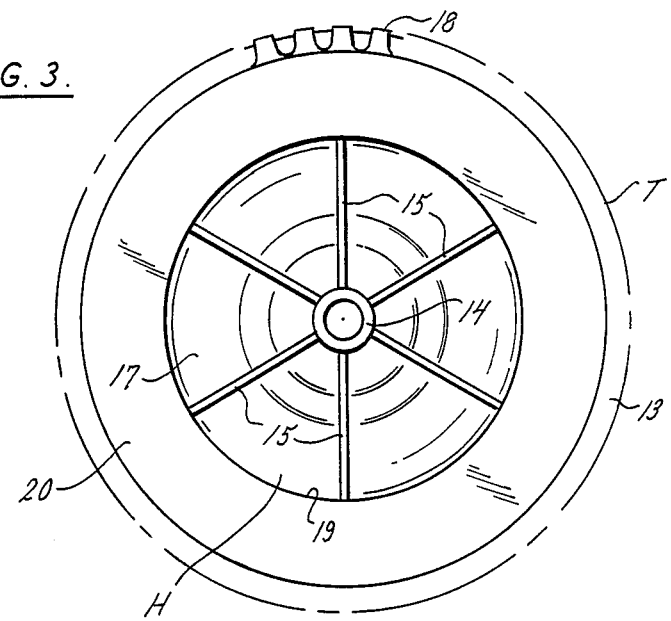
FIG. 3 is a view of the finished wheel as seen from the side opposite the view of FIG. 2, and taken along line 3—3 in FIG. 2.

In FIG. 1 the wheel assembly 10 consists of a molded hub H having a central opening 11 formed to receive an axle (not shown) and a molded tire T. The tire is formed with a side wall 12 (FIGS. 1 and 4) that is normally exposed to view and is adapted to cover a portion of the underlying hub area. The reverse or normally the inner side of the wheel 10 is seen in FIG. 3 to show the interlock flange 13 of the tire thread T. The central opening 11 in the hub is formed with a bearing tube 14 (FIG. 2) and a plurality of fin-like spokes 15 circumferentially spaced apart and radiating out from the bearing tube 14 as radially directed spokes 15. The spokes are integral with the disc 17 but do not become visible from the normal outer viewing side depicted in FIG. 1 because they are covered by the disc 1.

The tire T is molded with a tread pattern 18 which is only partly seen in FIG. 1, and there is an inwardly directed tire side wall 12 at a first predetermined side which has an outwardly exposed bead 12A and an inner lip 12B. In the molding of the hub H the portion of the hub that is covered by the tire side wall 12 is normally designed to have a plurality of circumferentially spaced and radially outwardly directed fins 21 (see FIG. 2) for load carrying purposes. The fins 21 are part of the spokes 15 and are joined to the rim 19 of the hub H represented by the central disc 17.

Figure 4:
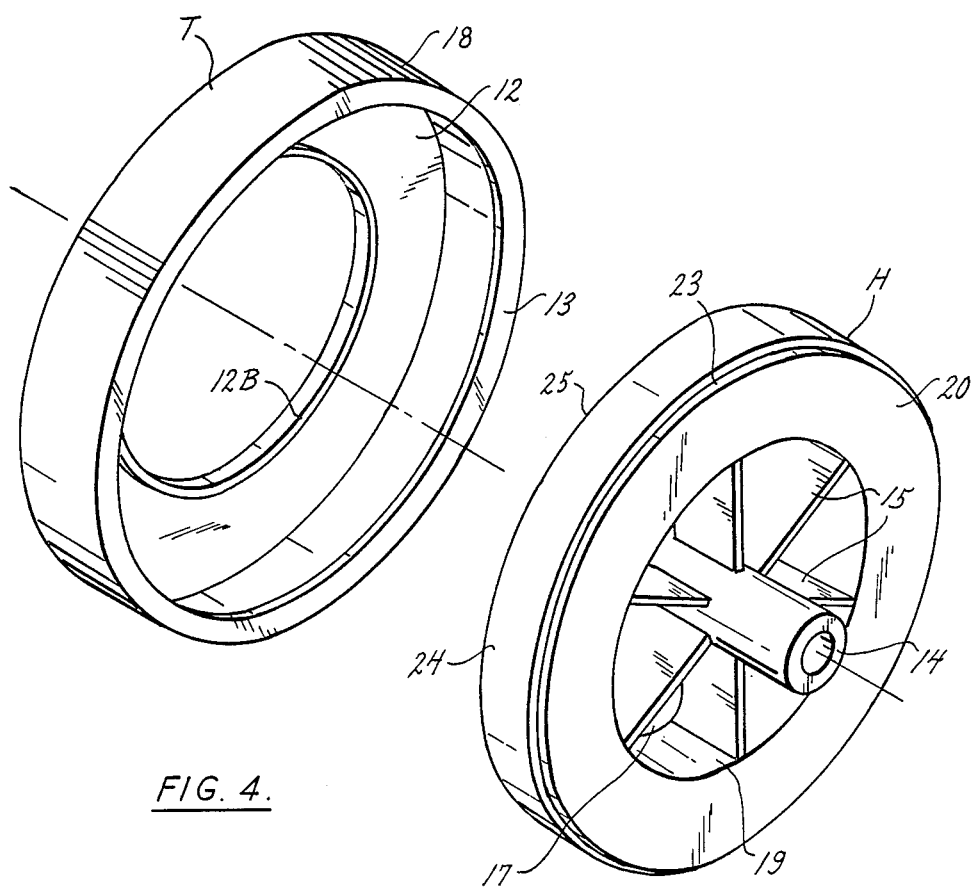
FIG. 4 is an exploded and perspective view of the hub and tire aligned for assembly.

The opposite or inner side of the wheel assembly 10 is seen in FIGS. 3 and 4. Again, a fragmentary part is depicted of the tread pattern 18 for the tire T is seen, and in this view the hub H can be seen to be formed with an exposed side wall 20 that is joined with the spokes 15. The side wall 20 joins and cover the fins 21 that are where the wheel is viewed the opposite side from normally hidded by the tire side wall 12. In this view the tire T has a circumferential interlocking flange 113 a first predetermined side in position to enter and seats on and grips a marginal recess 23 (see FIG. 4) of the hub H.

Further details of the tire T and hub H components of the wheel 10 are seen most clearly in FIG. 4. The fins 21 previously mentioned and covered by the tire side wall 12 can be seen at 21 in FIG. 2 as an extension of the spokes 15 and central disc 17. These fins 21 are integrally molded into a circumferential rim 24, and this rim is formed at a second predetermined side with a raised portion that has a bevel surface 25 to receive the tire lip 13 and allow the lip 13 to ride up and over the surface portion on rim 24 so it can snap down into the recess 23 thereby locking the tire T to the hub H.

The method of making the wheel 10 is to mold the hub H separately from the tire T. Both hub and tire are formed from high density polyethylene which has a known shrinkage factor upon cooling and curing. This factor of shrinkage requires that the final hub dimension be held to a specific value, and the tire T must also be specifically sized in the molding phase so that it can be assembled on the cured hub H before the tire has cooled and cured. The cooling and curing of the tire T must occur while on the hub H as the final condition of assembly is to have the tire T reach its grip and locked condition on the hub H after it has cured. In this method no special tools or equipment is required as the tire T is assembled on the hub H while it is still relatively pliable and has not shrunk or cured. It is this method of joining the tire T to the hub H that is unique due to the hub H spokes 15, fins 21 and rim 24 having reached a dimensionally stable condition at the time when the tire T is still pliable and easy to slip into final position ahead of reaching a stable condition. The assembly of the the tire T is made easy by providing the rim 24 of the hub with a formed receiving or bevel surface 25 on the raised portion of the hub which allows the locking lip 22 13 to slide over the surface 24 from a first predetermined side adjacent the bevel surface 25 and seat in the rim notch 23 at the second predetermined side.

A wheel having a tire T and hub H made and assembled in the described method, and with the structural characteristics noted, has a wide use in connection with carts of all types that require wheels, as well as such wheels rendering articles mobile.

What is claimed is:

1. A method making a wheel consisting of a hub and a tire for the hub, the method comprising the steps of:
    (a) molding the hub of a plastic material to form a circumferential rim presenting an outer raised surface having a rim notch formed therein at a first predetermined side and such that on cooling the hub, the hub and rim shrink to assume a substantially fixed size so as to become dimensionally stable;
    (b) molding the tire of a plastic material that on cooling, also like the cooling of the hub, shrinks and becomes dimensionally stable;
    (c) first allowing the hub to cool and become dimensionally stable; and
    (d) thereafter slidably joining the tire to the rim from a second predetermined side of the rim opposite the rim notch prior to the tire cooling such that upon cooling and shrinking the tire becomes fixed to the outer surface of the rim and locks on to the rim notch from said first predetermined side of the rim.

2. The method of claim 1 in which the hub is molded with the circumferential rim having the raised surface formed with a bevel margin presented radially outwardly on the circumferential rim adjacent the second predetermined side of the rim and spaced from said outer surface formed with a notch; and in which the tire is molded with a tread having a side wall at the second predetermined side of the rim and with a radially inwardly extending lip at the side opposite said tread side wall 3. The method of claim 2 in which the joining of the tire to the rim is effected by passing the radially inwardly extending lip over the bevel margin and raised surface of the rim to a position to have the lip engage in the rim notch for securing the tire to the rim with the tread side wall embracing an underlying portion of the second predetermined side of the rim.

4. A method of making a wheel consisting of a hub and a tire, the method comprising the steps of:
    (a) molding the hub with a central bearing, a plurality of spokes circumferentially spaced apart and radiating out from the bearing, an open center disc-shaped side wall surface covering outer ends of the spokes from view at a first predetermined side of the hub, and a rim circumferentially surrounding said spokes and a series of circumferentially spaced and radially outwardly extending fins, the fins being molded into the rim to form open spaces under the rim, and the rim having a circumferentially extending marginal recess at a first predetermined side of the rim;
    (b) molding a tire with a circumferentially directed tread having at a first margin a radially inwardly directed side wall and at a second margin, a radially inwardly directed lip;
    (c) first allowing the molded hub to cool and assume a dimensionally fixed size; and
    (d) assembling the molded tire on the hub before the tire has time to cool such that the tire tread covers the hub rim, the tire side wall encloses the series of fins opposite the open center disc-shaped side wall on the hub, and the inwardly directed lip slides over the hub rim and snaps into engagement in the marginal recess of the rim, and thereafter allowing said molded tire to cool in place on the rim to attain a dimensionally fixed size in which the tire is locked onto the rim by the lip in the recess.

* * * * *